United States Patent [19]

Meier

[11] 4,455,339

[45] Jun. 19, 1984

[54] PACKING FOR AN EXCHANGE COLUMN

[75] Inventor: Werner Meier, Elgg, Switzerland

[73] Assignee: Sulzer Brothers Ltd., Winterthur, Switzerland

[21] Appl. No.: 398,188

[22] Filed: Jul. 14, 1982

[30] Foreign Application Priority Data

Jul. 30, 1981 [CH] Switzerland .................. 4927/81

[51] Int. Cl.³ ............................................. B01D 47/02
[52] U.S. Cl. .................................... 428/185; 428/603; 261/112; 261/DIG. 11; 261/DIG. 72; 165/166
[58] Field of Search ...................... 428/185, 604, 603; 261/112, 95, 101, 102, 103, 104, 108, DIG. 11, DIG. 72; 165/166

[56] References Cited

U.S. PATENT DOCUMENTS

| 3,037,592 | 6/1962 | Shipley et al. | 428/185 X |
| 3,887,664 | 6/1975 | Regehr | 261/112 |
| 3,963,810 | 6/1976 | Holmberg et al. | 261/112 |

Primary Examiner—Alexander Thomas
Attorney, Agent, or Firm—Kenyon & Kenyon

[57] ABSTRACT

The packing is constructed for an exchange column and is provided with corrugated lamellae which have steep portions disposed between the various corrugations in order to accelerate the descending liquid phase between the corrugations. The steep portions are vertically arranged between adjacent corrugations or between pairs of adjacent corrugations.

5 Claims, 13 Drawing Figures

U.S. Patent  Jun. 19, 1984  Sheet 1 of 2  4,455,339
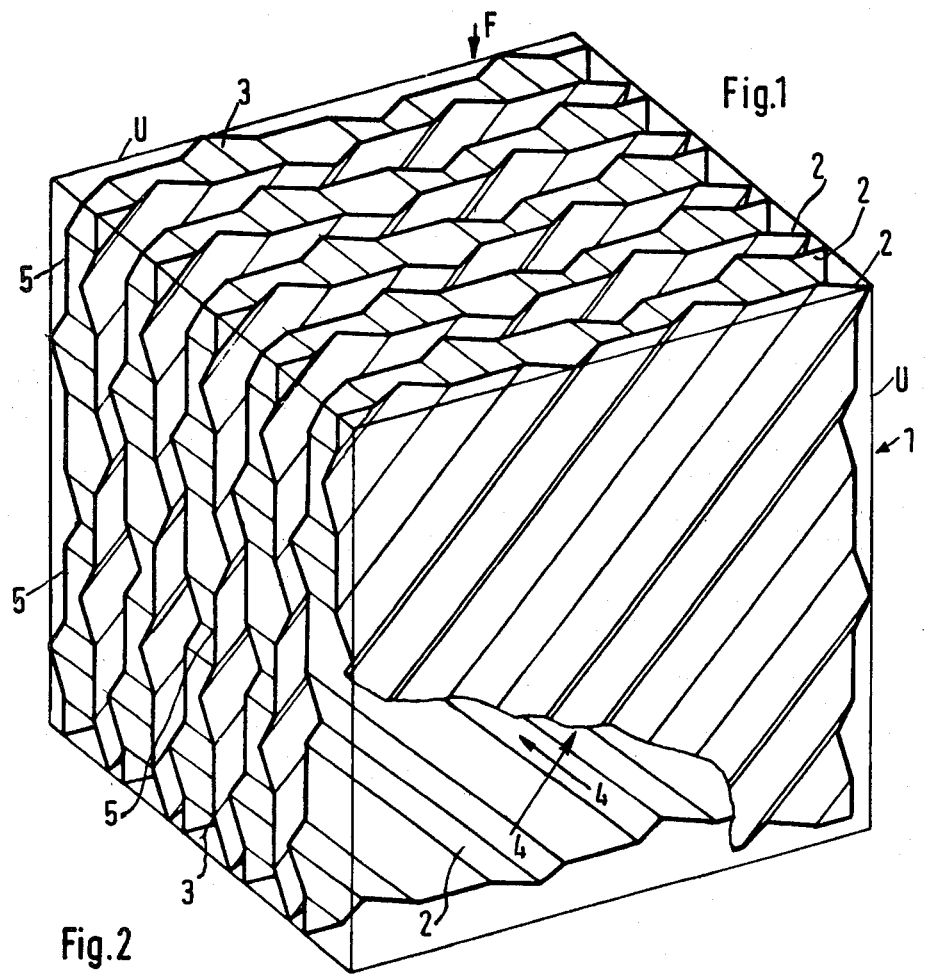
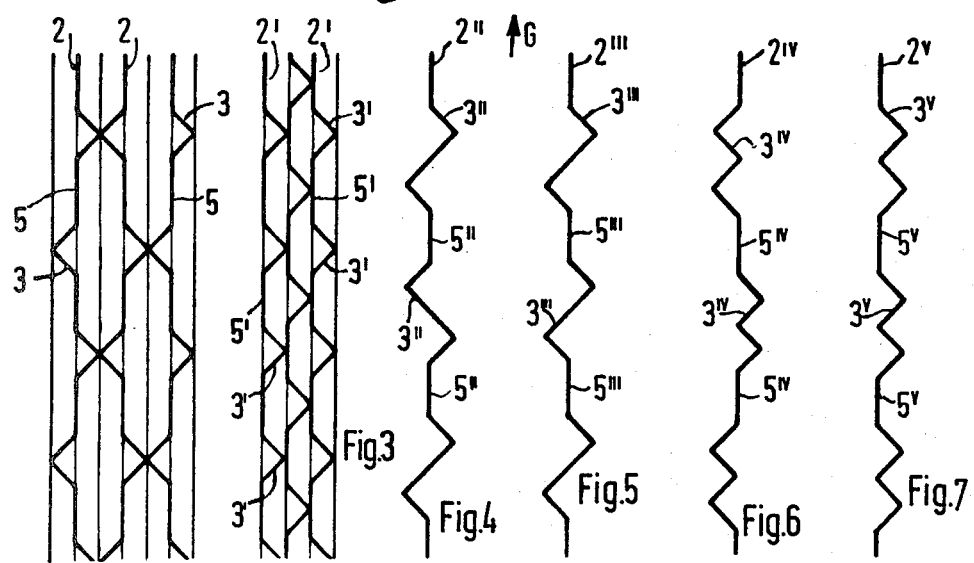

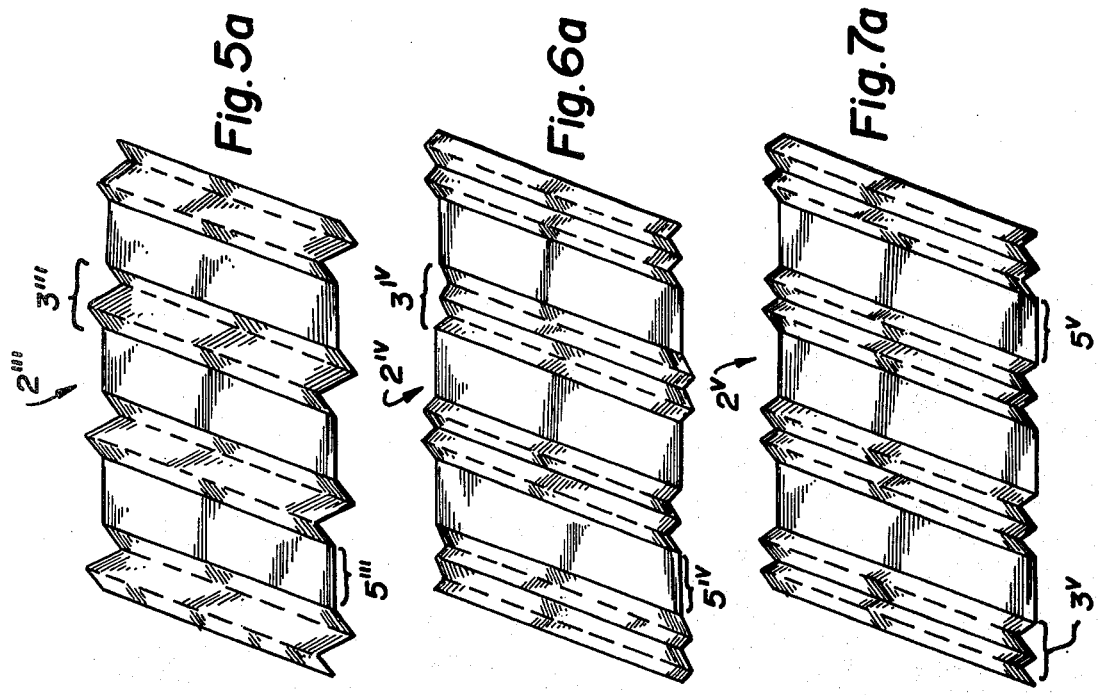
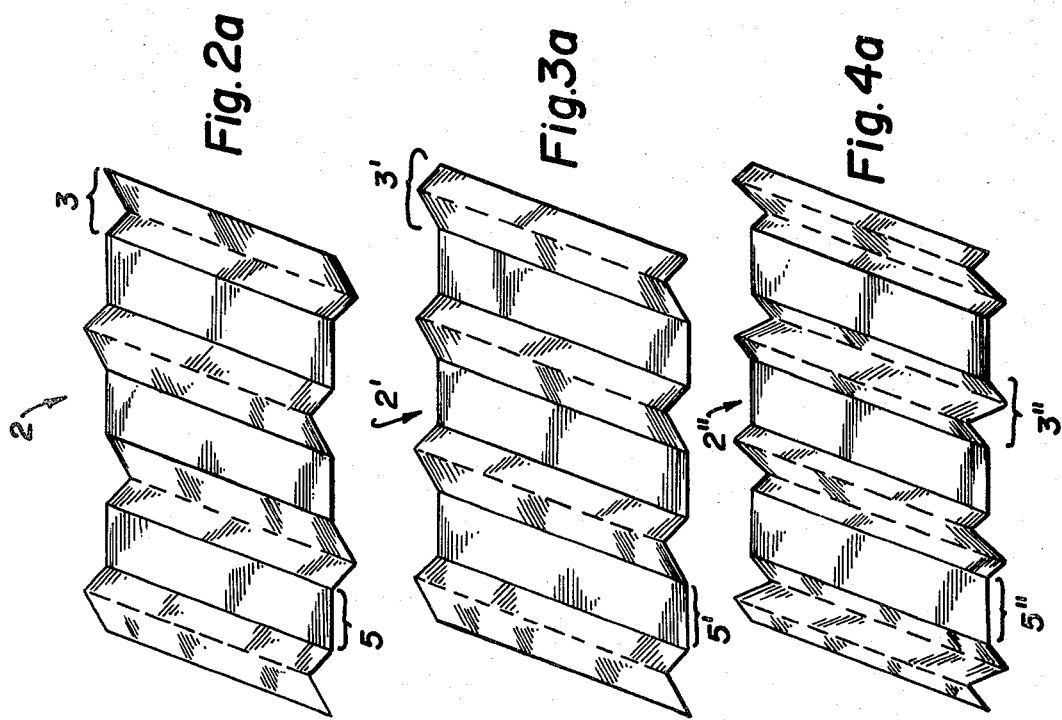

PACKING FOR AN EXCHANGE COLUMN

This invention relates to a packing for an exchange column and particularly for a mass transfer column or a direct heat exchange column.

As is known, various types of packings have been provided for columns in which a mass transfer or a direct heat exchange takes place. In one case, as described in Swiss Pat. No. 398,503, the packings have each been constructed of a plurality of contiguous parallel corrugated plates or lamellae which are placed side-by-side such that the corrugations of each plate touch and crisscross with the corrugations of an adjacent plate. As such, the surfaces of the lamellae form trickle surfaces for a descending phase, such as a liquid phase, while the corrugations define flow channels for a rising phase, which may be a gas phase in a rectifying column or a liquid phase in an extraction column.

Generally, the lamellae of the known packings have been corrugated in an uniform manner over their entire surface. Consequently, the whole of the superficial area of the trickle surfaces is covered with a film of uniform thickness. Thus, an equalization of the concentration between the two phases is the result solely of diffusion events. Furthermore, these packings generally have a relatively high pressure drop.

Accordingly, it is an object of the invention to accelerate the mass transfer or heat exchange which takes place in a packing or an exchange column.

It is another object of the invention to reduce the pressure drop in a packing for an exchange column.

Briefly, the invention provides a packing for an exchange column which is comprised of a plurality of corrugated lamellae disposed in vertical parallel relation. In addition, each lamella has a plurality of corrugations which are disposed in angular crossing relation to the corrugations of an adjacent lamella while the corrugations of said lamellae are interrupted by steep portions.

The interruption in the corrugated format of the discrete lamellae with relatively steep portions causes, for example, in rectification, less frequent deflection of the gas phase so that there is a considerably reduced pressure drop along the packing. Consequently, the trickle film surface which is available for a mass transfer can be greater than in previously known packings of this type for a given pressure drop.

In addition, a mass transfer or heat exchange can be accelerated because the film thickness of the descending liquid phase changes at the transitions from the corrugated portions to the steeper portions as well as from the steeper portions to the next corrugated portions. Thus, a new liquid surface arises at each transition with the liquid stream accelerating in the steeper portions and decelerating in the corrugated portions.

Because of the alternating corrugated portions and steeper portions, the molecules move from the center of the descending stream of liquid to the surface of the stream and vice versa. This mechanical motion is several times faster than the movement of the molecules by diffusion. Consequently, differences in concentration or temperature can be compensated not only by diffusion by also by the rapid movement of the discrete liquid molecules or particles relative to one another. Thus, the exchange operation is considerably improved. These and other objects and advantages of the invention will become more apparent from the following detailed description taken in conjunction with the accompanying drawings wherein:

FIG. 1 illustrates a perspective view of a part of a packing constructed in accordance with the invention;

FIG. 2 illustrates a side view of a packing constructed in accordance with the invention;

FIG. 2a illustrates a perspective view of a lamella of the packing of FIG. 2;

FIG. 3 illustrates a side view of a modified packing constructed in accordance with the invention;

FIG. 3a illustrates a perspective view of a lamella of the packing of FIG. 3;

FIG. 4 illustrates a side view of a modified lamella shaped in accordance with the invention;

FIG. 4a illustrates a perspective view of the lamella of FIG. 4;

FIG. 5 illustrates a further modification of a lamella in accordance with the invention;

FIG. 5a illustrates a perspective view of the lamella of FIG. 5;

FIG. 6 illustrates a third modification of a lamella in accordance with the invention;

FIG. 6a illustrates a perspective view of the lamella of FIG. 6;

FIG. 7 illustrates a fourth modification of a lamella constructed in accordance with the invention; and FIG. 7a illustrates a perspective view of the lamella of FIG. 7.

Referring to FIG. 1, the packing 1 may be of any suitable shape, for example, as shown by the contour lines U, the packing 1 may be of square shaped. However, the packing may be of other shapes such as cylindrical where the column in which the packing is to be used is of cylindrical shape. In such cases, the packing may have edge zones adapted to the inner generated surface of the column as is known.

As shown, the packing 1 comprises a plurality of corrugated lamellae 2 which are disposed in contacting vertical parallel relation. Each lamella has a plurality of corrugations 3 which are disposed in angular crossing relation to the corrugations 3 of a contiguous lamella in known fashion. In this respect, the term "corrugation" is intended to mean a corrugation of folded shape, jagged shaped or wavy shape.

As indicated, the crossing corrugations 3 of any two adjacent lamellae 2 bound open crossing flow channels 4. When in use within an exchange column, a liquid phase flows in the flow direction F while a gas phase, for example for a gas-liquid exchange, flows in an ascending flow direction G.

As shown, each of the lamella has a plurality of steep portions 5 among the corrugations 3. These steep portions 5 serve to interrupt the regular pattern of the corrugations 3 and serve to accelerate the descending liquid phase between the corrugations 3. As indicated in FIG. 2, the steep portions 5 extend at least substantially vertically between adjacent corrugations 3. Thus, the descending liquid phase can be accelerated between these corrugations 3.

Further, as shown in FIG. 2a, the corrugations 3 of each lamella 2 are disposed in an alternating pattern relative to opposite sides of the lamella 2 as well as to the steep portions 5.

Each lamella may also be formed with alternating patterns of corrugations and steep portions with each pattern of corrugations defining at least two flow channels. For example, referring to FIGS. 3 and 3a, the packing can be made of lamellae 2' wherein the corrugations 3' and the vertical steep portions 5' alternate with each other with the corrugations 3' on only one side of the lamella 2'.

Referring to FIG. 4, and 4a each lamella 2" may have corrugations 3" formed on opposite sides with vertical steep portions 5" between each pair of corrugations 3". As indicated, the pairs of corrugations 3" are arranged in a non-symmetrical relation relative to the vertical plane of the lamellae 2".

Referring to FIG. 5, and 5a each lamellae 2''' may be formed with pairs of corrugations 3''' which are separated by steep portions 5''' wherein the pairs of corrugations 3''' are arranged in a symmetrical pattern.

Referring to FIG. 6, and 6a each lamellae $2^{IV}$ may be formed with pairs of corrugations $3^{IV}$ on alternating sides which are separated by steep portions $5^{IV}$.

Finally, referring to FIG. 7, and 7a each lamellae $2^{V}$ may be formed with pairs of corrugations $3^{V}$ on only one side which are spaced by steep portions $5^{V}$.

The invention thus provides a packing which can be used in exchange columns so as to accelerate the mass transfer or heat exchange between various media while reducing the pressure drop through the packing.

The lamellae may be made for example of metal or plastic material. On the other hand the lamellae may well be made of a ceramic material as is described in the U.S. Pat. No. 4,157,929. In this case the packing can serve as a catalyst carrier.

What is claimed is:

1. A packing for an exchange column comprising
a plurality of corrugated lamellae disposed in vertical parallel relation, each said lamella having a plurality of corrugations disposed in angular crossing relation to the corrugations of an adjacent lamella to form a plurality of flow channels and
at least some of said lamellae having at least one steep portion interrupting two adjacent flow channels with said corrugations thereof disposed in an alternating pattern relative to opposite sides of said respective lamella and relative to a plurality of steep portions.

2. A packing as set forth in claim 1 wherein each said steep portion extends at least substantially vertically.

3. A packing for an exchange column comprising
a plurality of corrugated lamellae disposed in vertical parallel relation, each said lamella having a plurality of corrugations disposed in angular crossing relation to the corrugations of an adjacent lamella to form a plurality of flow channels and
at least some of said lamellae having at least one steep portion interrupting two adjacent flow channels with said corrugations thereof defining a pair of flow channels on each side of a respective steep portion.

4. A packing for an exchange column comprising
a plurality of corrugated lamellae disposed in vertical parallel relation, each said lamella having a plurality of corrugations disposed in angular crossing relation to the corrugations of an adjacent lamella to form a plurality of flow channels and
at least some of said lamellae having at least one steep portion interrupting two adjacent flow channels with said corrugations thereof disposed in pairs to each side of a respective steep portion.

5. A packing as set forth in claim 4 wherein said paris of corrugations of a respective lamella are disposed on only one side of said respective lamella.

* * * * *

UNITED STATES PATENT AND TRADEMARK OFFICE
CERTIFICATE OF CORRECTION

PATENT NO. : 4,455,339
DATED : June 19, 1984
INVENTOR(S) : Werner Meier

It is certified that error appears in the above-identified patent and that said Letters Patent is hereby corrected as shown below:

| Column | Line | Correction/Change From | To |
|---|---|---|---|
| 1 | 64 | Change the first "by" to but | |
| 4 | 32 | "paris" | -- pairs -- |

*Signed and Sealed this*

*Twenty-fifth* Day of *December 1984*

[SEAL]

Attest:

Attesting Officer

GERALD J. MOSSINGHOFF

*Commissioner of Patents and Trademarks*